Aug. 12, 1958     W. F. RACE     2,846,774
WHEEL ALIGNMENT TOOL
Filed Sept. 21, 1953     3 Sheets-Sheet 1

Inventor
WILLIAM F. RACE.
By~ Fetherstonhaugh+Co.
Att'ys

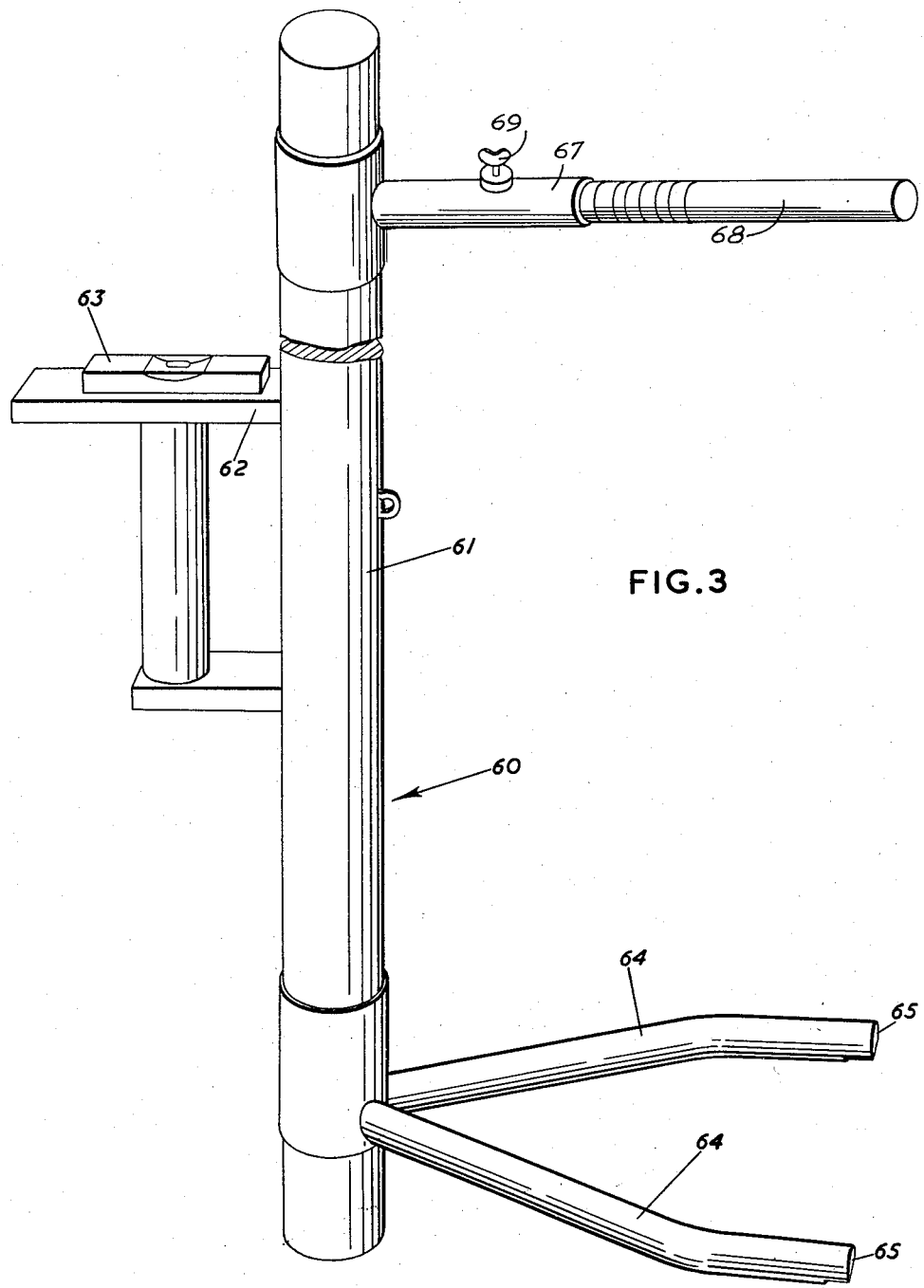

Aug. 12, 1958 W. F. RACE 2,846,774
WHEEL ALIGNMENT TOOL
Filed Sept. 21, 1953 3 Sheets-Sheet 3

Inventor
WILLIAM F. RACE.
By~ Fetherstonhaugh & Co.
Attys

United States Patent Office

2,846,774
Patented Aug. 12, 1958

2,846,774

WHEEL ALIGNMENT TOOL

William F. Race, Collingwood, Ontario, Canada

Application September 21, 1953, Serial No. 381,409

3 Claims. (Cl. 33—203)

This invention relates to means for checking the camber, toe-in and caster of automobile wheels.

Automobile wheels having knee action must be continually adjusted for camber and toe-in, because with use on rough roads wheels tend to become disaligned and to cause excessive wear on tires when the camber becomes very much out of adjustment. Most cars have adjustment members in the knee action or spring assembly for adjusting camber but it is always a problem to set the end of the car to be adjusted in a suitable jig that will give an indication of how the adjustments should be set. Previously, extensive machines have been provided for setting the camber adjustments on automobiles. I propose a very simple attachment with which the operation can be done in a minimum of time.

My invention is of principal use in connection with front wheel adjustments and it will be noted that the specific examples use the front wheels as an example. However, it will be noted that the invention has application to similar checks as far as they are required, on the rear wheels.

In the disclosure and claims, by the "wheel plane" is meant, a plane perpendicular to the wheel spindle; by the "wheel direction" is meant the direction of the line of intersection of the wheel plane with a horizontal plane; and by "opposite wheels" is meant either the pair of front wheels or the pair of rear wheels of an auto.

Also the term "support" is intended to include what is known in this art as a "jig."

The camber of an auto is the angle between the wheel plane and a vertical plane which intersects the wheel plane along a horizontal line.

The toe-in of an auto is the "gathering in of the front wheels." The toe-in may be found by setting the automobile front wheels for "straight ahead," and measuring the angle between the two wheel directions, that is the "toe-in" angle may be measured when the wheel directions make equal angles with the fore and aft axis of the car.

This invention utilizes a datum element which replaces an auto wheel on the wheel spindle and assumes the same general position in relation to the spindle as the wheel did. However, the datum element as opposed to the wheel replaced, is constructed to provide surfaces for representing the slope of the wheel plane and the angle of the wheel direction. By combining the datum element with the simple means for measuring its slope and means for comparing the direction of datum elements on opposite wheels, the camber and "toe-in" of the wheels may be measured. Moreover, the above measuring means are so located and designed that rapid reading may be made while correcting adjustments to the wheel suspension are made, enabling the adjustments to be easily and smoothly made.

In more specific detail, the invention contemplates a wheel support which may be attached to the spindles of opposite wheels and which support the car in the same manner as the wheels which have been previously removed.

The supports provide a pivotally mounted level and a bearing area.

By affixing a pointer on the level and providing a scale fixed to the support, the scale may be arranged to show 0° when the support is attached to a horizontal spindle. By pivoting the level on a horizontal axis arranged at right angles to the spindle, the scale may be calibrated to read the camber of the car wheel.

The bearing areas on the support co-operate with a connecting member placed between supports on opposite wheels. An indicating member at each end is mounted to align with the connecting member and is compared with a pivotally mounted member adapted to bear on and align itself with the bearing areas. By calibrating the comparison members at each end of the shaft, alignment and therefore the "toe-in" of the wheels will easily be determined.

The invention will be more readily understood by reference to the following specification read in conjunction with the accompanying drawings.

In the drawings which illustrate embodiments of the invention:

Figure 3 shows an auxiliary tool for use in checking camber; and

Figure 2:
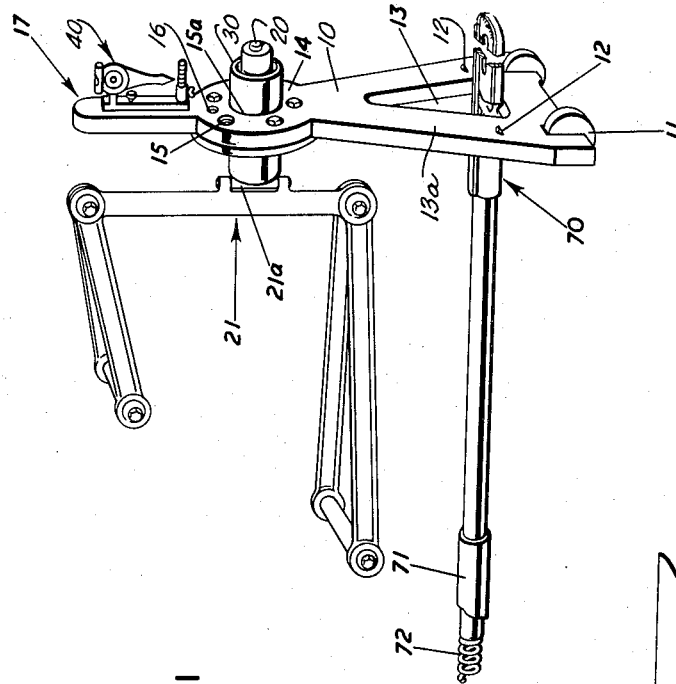
Figure 2 shows a portion of the alignment indicating element.

In the drawings, a support (or datum member) 10 is shown attached to front wheel spindles 20 by couplers 30. The spindles 20 are shown attached to a typical front wheel suspension indicated at 21 including king pins 21a. On the upper portion of the support 10 is shown the pivoted level and pointer assembly designated as 40. Lying on and operating in conjunction with the supports 10, is an alignment gauge 70.

The support 10 is adapted to bear the car to the same extent as the wheel which has been removed. When so bearing the car the support is non-rotatable about the spindle axis in any given orientation of the spindle, but is preferably provided with casters 11 which allow turning the supports to respond to movement of the starting mechanism.

The support 10 has a generally triangularly shaped base surrounding a triangularly shaped aperture 13. Conveniently spaced along a horizontal line are depressions 12 of semi-circular cross-section. Above the triangularly shaped base, a circular annulus 14 contains five spaced holes 15 equidistant from the annulus aperture 15a. It will be noted that one of the holes 15 is located directly below the annulus aperture 15a and diametrically across the aperture is a sixth hole 16.

Figure 1:
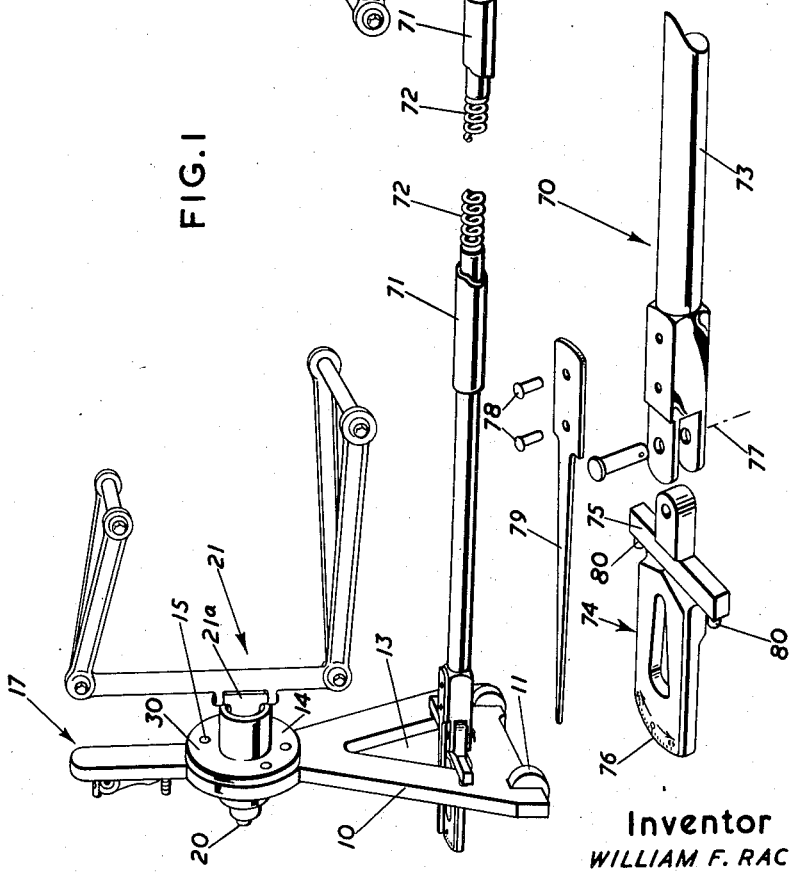
Figure 1 show the main elements of the invention in relation to the front wheel suspension of a car.
Figure 4:
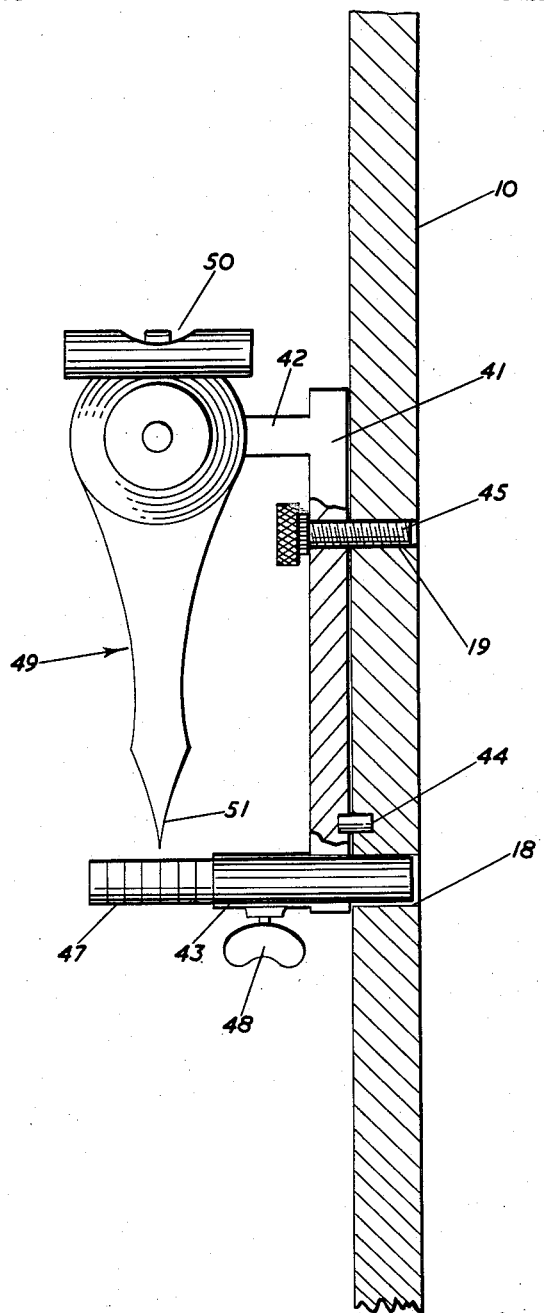
Figure 4 shows an enlarged view of the upper portion of the support.

As shown in Figure 1, the support 10 has been mounted by removing the front wheels and hubs, and replacing them on the front spindle with couplers 30 and suitable spacer elements (not shown). In this way, the coupler is securely attached to the spindle and is aligned therewith. The coupler 30 has a number of holes (three seems adequate) located to correspond with holes 15 so that support 10 may be securely bolted thereto and, therefore, rigidly attached to the spindle. For easy alignment, a portion of the coupler projects through the aperture 15a.

Projecting above aperture 15a is arm 17 on which is located a smooth lower aperture 18 and a spaced vertically aligned upper threaded aperture 19.

Mounted on the arm 17 is the camber measuring element 40 previously referred to as the pivoted level and pointer assembly. This assembly comprises a vertical standard 41 with an upper horizontal arm 42 and a lower horizontal sleeve 43. Lower horizontal sleeve 43 slidably receives a projecting camber scale arm 47 whose projection may be fixed by thumbscrew 48.

If desired, the thumbscrew control of arm 47 may be dispensed with and by threading sleeve 43 and arm 47 the amount of projection may be controlled by the rotation of the arm in the sleeve.

Spaced vertically on standard 41 is a threaded bolt 45 extending through the standard. The spacing is so designed that bolt 45 threads in threaded aperture 19 attaching assembly 40 to arm 17 while scale arm 47 projects slidably into aperture 18. If further support for the assembly 40 is desired, complementary keying means may be provided in the standard 41 and the arm 17 as shown at 44.

Pivotally mounted on the upper horizontal projection 42 is an indicator arm 49. The pivotal axis is arranged to be horizontal and perpendicular to the spindle axis, when support 10 and assembly 40 are properly mounted. The indicator arm mounts a level 50 and a pointer 51 which extends sufficiently close to the scale arm 47 to give accurate visual indication of that portion of the scale arm to which the pointer is directed.

The scale arm 47 is marked longitudinally in degrees and is initially set so that 0° is indicated by the pointer 51 when the support is mounted on a horizontal spindle and the level 50 is centred. The degree indications increase outwardly (away from the car) from the 0° mark.

To calibrate the device, therefore, the support is held as if attached to a horizontal spindle and the level 50 centred. The 0° mark on arm 47 is then slid directly opposite the pointer 51 and thumbscrew 48 tightened. It will be noted then, for any angle of slope of the spindle axis which would cause corresponding wheel camber, a corresponding degree reading will be obtained on arm 47 by centering level 50.

Alternatively degree readings may be obtained by an aperture (not shown) spaced along the upper surface of sleeve 43 with a datum mark bordering the aperture. Corresponding marks on the arm 47 will indicate the position of a mark on the arm extension under the pointer. Therefore with the correct camber reading set against the datum, and the pointer directed at the mark, the camber must be adjusted until the level is centered showing that the camber angle is correct.

In Figure 3 is shown a rough camber measuring instrument 60, comprising a standard 61. From the lower end of standard 61 project two arms 64 terminating in studs 65 spaced and shaped to rest in depressions 12. From the upper end of said standard projects a telescopic arm 66 comprising a sleeve 67 and a slidable inner member 68 which may be fixed in position by the thumbscrew 69.

If desired the thumbscrew control of member 68 may be dispensed with and by threading sleeve 67 and member 68 the amount of projection may be controlled by the rotation of the member in the sleeve.

Projecting from the opposite side of the standard 61 to the aforesaid arms is an arm 62 bearing a level 63. The ends of studs 65 and of slidable member 68 define a plane. By adjustment of slidable member 68, the angle between the plane and the axis of level 63 may be varied. The slidable member 68 is, therefore, calibrated in degrees of such angle with 0° representing the extension of member 68, where the plane of said outer ends is perpendicular to said level axis, and other degrees represent the deviation of the plane from perpendicularity.

The end of outer member 67 is a datum for such degree settings and it will be noted that the degree values decrease with extension of member 68.

Alternatively degree readings may be obtained by an aperture (not shown) spaced along the upper surface of sleeve 67 with a datum mark bordering the aperture. Corresponding marks on the inner member 68 will indicate the position of a mark on the arm extension under the pointer. Therefore, with the correct camber reading set against the datum and the pointer directed at the mark, the camber must be adjusted until the level is centered showing that the camber angle is correct.

It will, therefore, be obvious that when the scale reading on member 68 is, say 5°, and the "said outer ends" are held against a surface whose slope (upwardly away from standard 61) is intended to be 5°, the level 63 will immediately give an indication of whether or not the surface assumes the desired slope.

It will be noted that, although the above arrangement of elements seems best suited for the invention, that any three contact points defining a plane, two being horizontal while the other is telescopic, and calibrated in degrees of inclination of the plane to a level axis, will suit the purposes of the invention.

In use, the "rough check" member 60 has the inner scale member 68 adjusted to give the camber value in degrees of the car being checked. The said outer ends are then held against the wheel fellows in such a position that the said outer ends are at the same radial distance from the hub and that the lower two of the ends are horizontal. The level 63 will then give an accurate indication of whether camber adjustment is necessary.

Before describing the alignment gauge 70, it is desired to describe the operation of checking and adjusting front wheel camber. On an auto with its front wheels approximately straight, the rough check member 60 is held against the tires, the scale member 68 being set for the desired degree of camber for that particular make of automobile. Assuming that the level 63 is not centered, indicating that camber adjustment is necessary, the front wheels are jacked up and removed. Then supports 10 are either bolted on the hubs or the hubs are removed and the supports 10 mounted on couplers 30 which are then mounted on the wheel spindle. The car is then lowered and the front end is then supported by supports 10. Casters 11 allow for movement of supports 10 relative to the floor. It will be noted that the king-pin axis of a car determines the camber value. Therefore, to obtain a correct camber reading, the wheels should be aligned for straight ahead driving. This may be done approximately by eye. There is later shown means for attaining such orientation exactly.

The jigs 10 now being in place and bearing the forward end of the auto, the camber measuring assembly 40 (if not already mounted) is mounted in place on jig 10. The centering of scale 50 and the corresponding reading obtained on scale markings 52 indicate the necessary adjustment, and by adjustments of the camber controlling elements of the wheel suspension, interspersed with readings on markings 52, the camber may be adjusted.

Turning now to Figure 2, and also with reference to Figure 1, the alignment or "toe-in" indicator 70 has a central sleeve 71 containing an expansion spring 72 which tends to urge outwardly shafts 73 riding in each end of said sleeve. The total lengths of the shafts 73 and sleeve 71 should be sufficient to extend between the two front wheel suspensions of any popular car and the telescopic mountings for shafts 73 allows for any variations in such models.

The outer end of each shaft 73 is pivotally connected to an indicator arm 74 having a cross-arm 75 and a degree scale 76 which is laid out on a circle having pivot point 77 as the centre.

Rigidly mounted (say by screws 78) on and outwardly extending from, the end of shaft 73, is a pointer 79 of such a length as to indicate degree values on the scale 76. On each arm of cross-arm 75 are contact studs 80 extending in the same direction as said pointer. For use the pointer and scale should be so calibrated that the pointer is at the centre of the scale and reads 0° when the contact points lie along a line perpendicular to the axis of shaft 73.

The alignment indicator is used when the supports 10 are mounted on the wheel spindles and the front end of the car is resting thereon. The steering of the car should be approximately adjusted for straight ahead.

The alignment indicator is then laid under the car with the two dials projecting through the triangular aperture 13. The expansion of the spring 72 presses contact studs 80 against legs 13a beside the aperture. The pivotal mounting of indicator arm 74 and the spring urging of shaft 73 outwardly causes contact studs 80 to align themselves with the support 10. The reading of the scale 76 will indicate the deviation of the studs 80 from a line perpendicular to shaft 73 and indicates the wheel direction.

Assume that the desired "toe-in" angle is 6°. The wheels are rotated until the pointer 79 and scale 76 on one side of the car read 3° forward of the 0° datum. The other wheel is then adjusted until its respective pointer 79 and scale 76 also reads 3° forward of the 0° datum. The "toe-in" of the car is then 6° as required.

It is noted that the front wheels are brought into symmetry with the fore and aft axis. This is necessary to get a correct "toe-in" adjustment in view of the slope of the king-pins 21a.

Caster is the angle which the king-pins 21a make with a vertical plane running transversely, or perpendicular to the fore and aft axis of the car. With this instrument, by setting the wheel directions to desired values, the caster of the two front wheels may be compared and subsequently adjusted.

To illustrate, assume that the camber and caster are adjusted with the wheel directions symmetrical with respect to the fore and aft axis. The wheels are then turned until the right hand scale reading is (say) 20°, forward of the 0° datum. The camber of the right hand wheel is then measured. The wheels are then turned until the same scale reading is the same value (20°) rearward of the 0° datum; the camber is again measured. A similar operation is performed with the left hand wheel and its corresponding scale.

If the caster is the same for both wheels, the camber for 20° forward of the scale 0° datum will be the same for both wheels and the camber of both wheels for 20° rearward should be the same (although different from the forward readings). On the other hand, unequal camber readings for either the forward or rearward positions will indicate incorrect caster and king-pin orientation.

It should also be noted that for precision adjustments, the "toe-in" and symmetry of the wheel directions about the fore and aft axis will control the camber value. Therefore when the "toe-in" adjustment is complete and the wheels are still in their symmetrical position it may be desirable to again check and re-adjust the camber.

It will be noted that the alignment gauge and the camber measuring instrument may be used to check caster.

An alternative design (not shown) for the alignment indicator utilized a tension spring connected to the pointer arms which are pivotally connected to scale blocks which (pulled in by the tension spring) contact the outer surface of each jig. Co-operation of pointer and scale gives alignment readings as before while the alternative design avoids a disadvantage of the embodiment illustrated, that the sleeve 71 or the shaft 73 may become bent and give incorrect alignment readings.

It will be seen that there has been here described, a datum element which carries areas which assume the inclination of the wheel plane and areas which indicate the wheel direction together with means for measuring and translating such slope and direction into camber and alignment measurement.

What I claim as my invention is:

1. Means for measuring the wheel caster and camber of automobiles comprising: a rigid datum member mountable on a wheel spindle and having at least two surface contacting points on which said datum member may rest in contact with a supporting surface while supporting said automobile, said at least two surface contacting points each being radially farther from said spindle than the shortest radial distance from said spindle to said supporting surface, a level bearing pointer arm pivotally mounted on said datum member, the pivotal axis of said arm being horizontal and parallel to the wheel plane; and a scale rigidly attached to said datum member located to indicate the angular position of the pointer on said pointer arm.

2. In combination: an automobile wherein the wheels are normally mounted on spindles but wherefrom two opposite wheels have been removed from their respective spindles, a rigid datum member mounted on each of said wheel spindles, each said datum member having at least two surface contacting points on which said datum member may rest in contact with a supporting surface while supporting said automobile, said at least two surface contacting points each being radially farther from said spindle than the shortest radial distance from said spindle to said supporting surface, a level bearing pointer arm pivotally mounted on each said datum member, the pivotal axis of said arm being arranged to be horizontal and parallel to the wheel plane when said datum member is supporting said automobile, and a scale rigidly attached to each said datum member, said scale being located to indicate the angular position of said pointer on said pointer arm.

3. Means for measuring the wheel caster and camber of automobiles comprising: a rigid datum member mountable on a wheel spindle and having at least two surface contacting points on which said datum member may rest in contact with a supporting surface while supporting said automobile, said at least two surface contacting points each being radially farther from said spindle than the shortest radial distance from said spindle to said supporting surface and means for measuring the inclination of said datum member.

References Cited in the file of this patent

UNITED STATES PATENTS

| | | |
|---|---|---|
| 1,206,476 | Snyder | Nov. 28, 1916 |
| 1,544,980 | Hartsook | July 2, 1925 |
| 1,601,261 | Prather | Sept. 28, 1926 |
| 1,653,249 | Bennett | Dec. 20, 1927 |
| 1,870,106 | Evans | Aug. 2, 1932 |
| 1,974,006 | Bennett | Sept. 18, 1934 |
| 2,059,654 | Quigley | Nov. 3, 1936 |
| 2,160,226 | Phillips | May 30, 1939 |
| 2,522,066 | Smith | Sept. 12, 1950 |
| 2,532,749 | Aurand et al. | Dec. 5, 1950 |
| 2,619,731 | Zenz | Dec. 2, 1952 |

FOREIGN PATENTS

| | | |
|---|---|---|
| 612,699 | Great Britain | Nov. 10, 1948 |